United States Patent Office 2,721,355
Patented Oct. 25, 1955

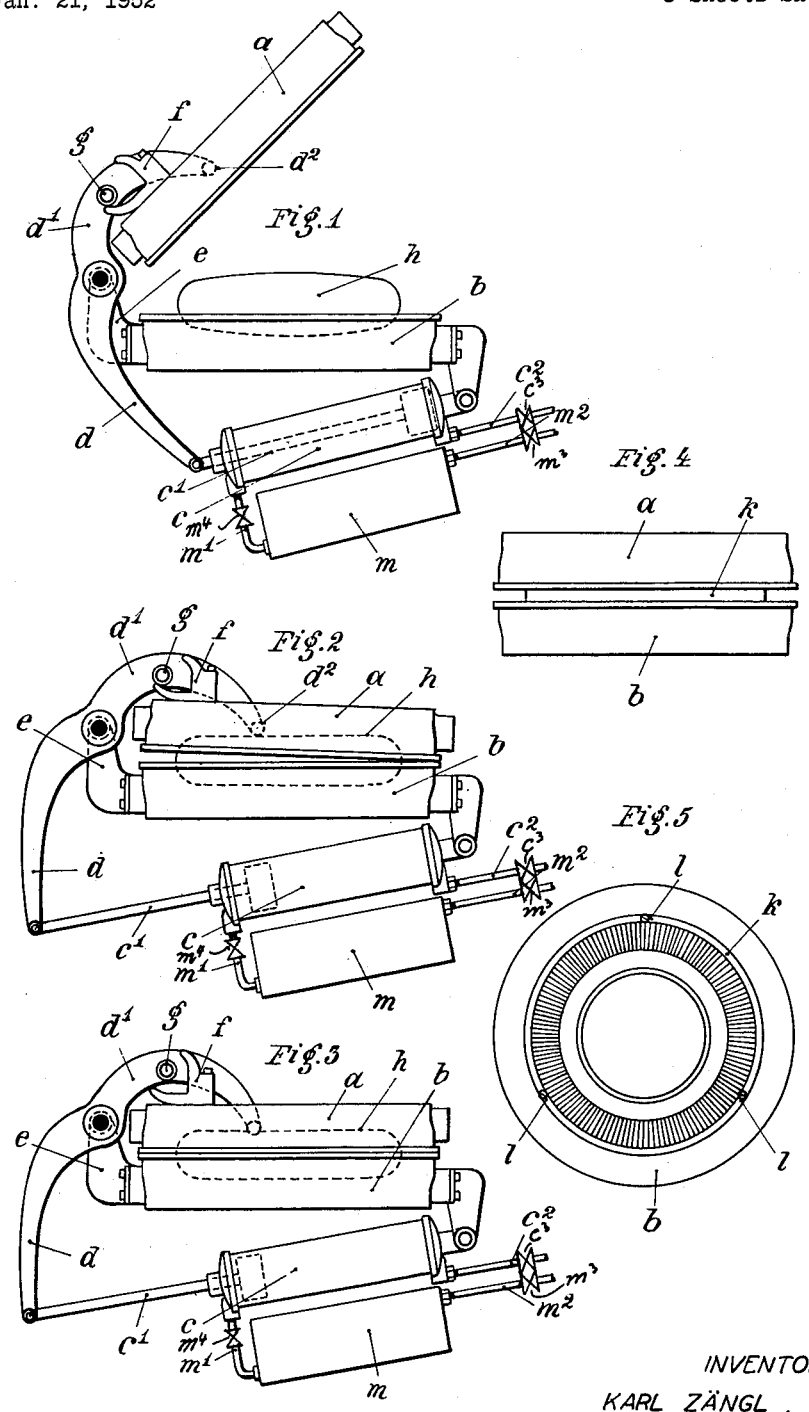

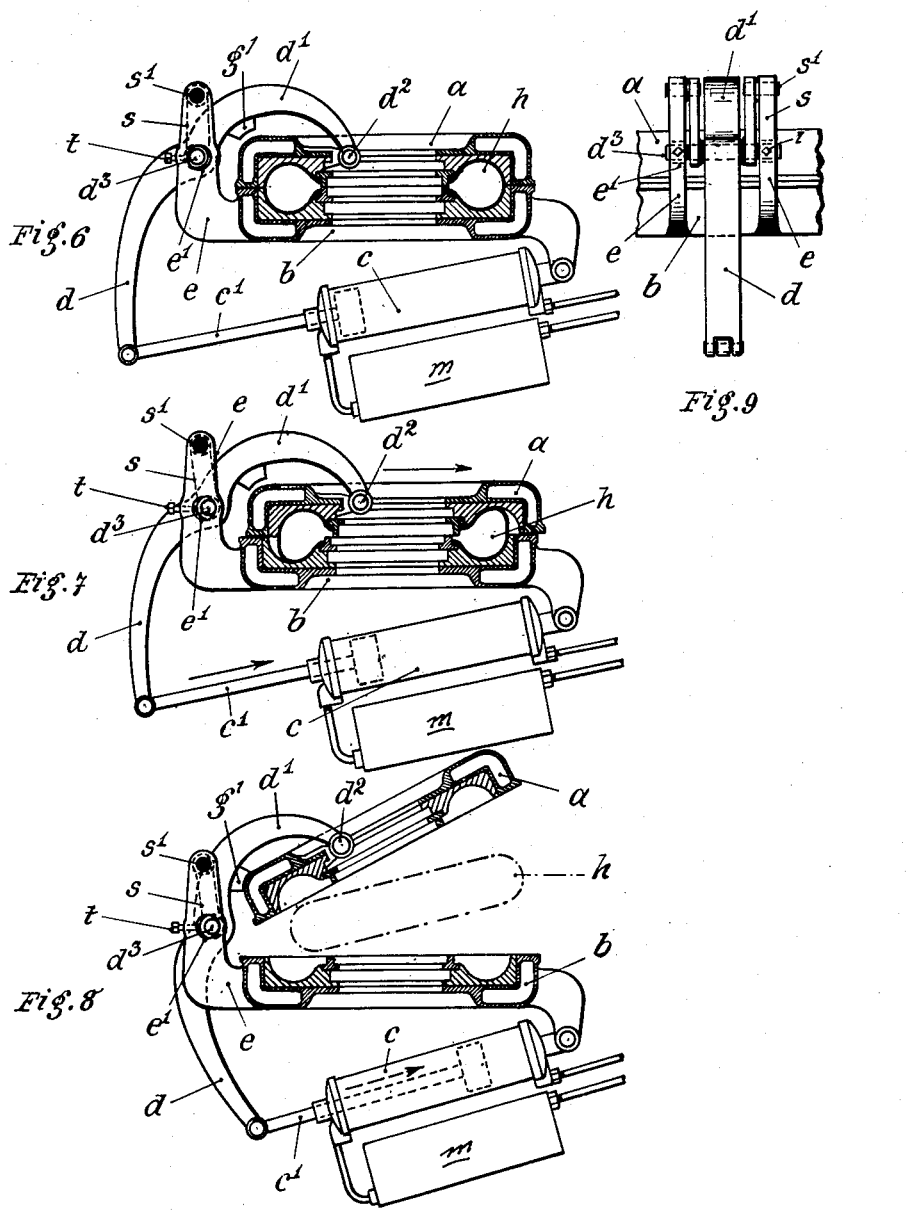

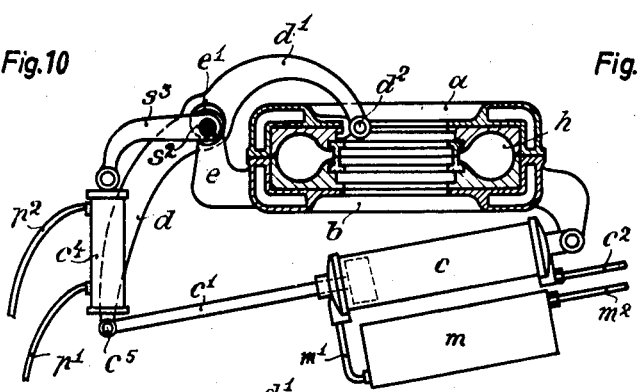
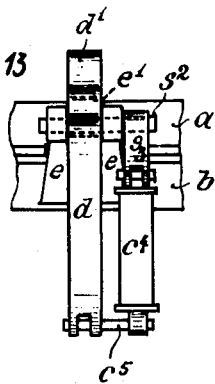
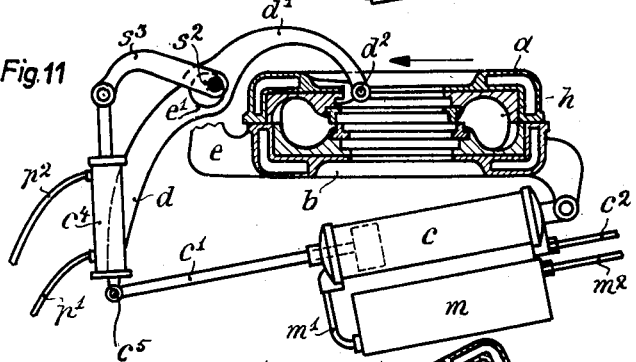
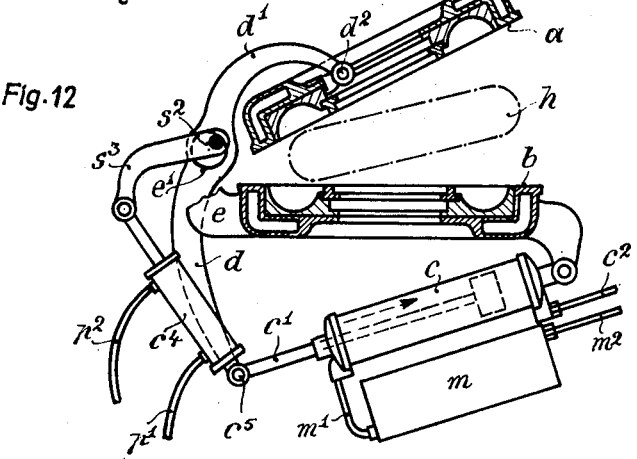

2,721,355

TIRE VULCANIZING PRESS

Karl Zängl, Munich, Germany

Application January 21, 1952, Serial No. 267,323

Claims priority, application Germany January 27, 1951

13 Claims. (Cl. 18—17)

The present invention relates to a press for vulcanizing automobile tires having a stationary lower part, an annular recess therein, and an upper part having an annular recess facing the recess in the lower part and adapted to receive, together with the recess in the lower part, a tire in substantially horizontal position when the press is closed, and more particularly to novel means for suspending the upper part and connecting it with the lower part in such a way that the tire is automatically forced to assume the desired position when the press is closed and to facilitate opening of the press and removal of the tire therefrom.

It has been found that the conventional hinge connection between the upper and lower parts of a tire vulcanizing press is unsatisfactory, as it must be provided with additional means to displace the upper part relatively to the lower part to make it suitable for different tire sizes and to avoid squeezing the tire when the press is closed. When closing conventional presses, the upper part moves onto the lower part by gravity and additional effort by the operator is required for correctly fitting the tire and tightly closing the press.

It is an object of the present invention to provide a vulcanizing press which avoids the aforesaid disadvantages of conventional presses. The new press comprises a mechanism for opening and closing the press which automatically forces the tire into the correct position in the press without undesired squeezing when the press is closed and which facilitates opening of the press by simultaneously loosening the tire from the form.

The opening and closing mechanism of the press according to the present invention is actuated by a servomotor, preferably of the type having a pneumatic hydraulic power cylinder, which is positioned underneath the stationary lower part of the press and whose one end is swingably connected with said lower part. The servomotor acts on one end of a two-arm lever which is fulcrumed to the lower part to swing in a substantially vertical plane. The upper part of the press is swingably suspended from the other arm of said lever. There is no conventional hinge connection between the upper and lower part, and the upper part descends loosely on the lower part when the press is closed and in such a way that it reaches the lower part at a slant, i. e. it contacts it first at a point only and is then caused to close gradually, whereby the tire is smoothly pressed into the desired position. The upper part is forced positively onto the lower part for tightly closing the press. The inclined position of the upper part relative to the lower part during the closing process is produced either by unsymmetrically suspending the upper part on the two-arm lever or by weighting a portion of the upper part or providing a spring which urges the upper part into the desired position. The two-arm lever and/or the upper part are preferably provided with a suitable abutment to limit the relative movement of the two-arm lever and the upper part of the press depending therefrom.

A further object of the invention resides in the provision of means in a mechanism as described above for displacing the fulcrum of the two-arm lever in a predetermined manner to cause a horizontal movement of the upper part at the time when opening of the press is initiated, to loosen the tire from its form so that it falls out of the upper part by gravity when the press is fully opened.

Other objects will appear from the following description of this invention.

The manner in which the foregoing objects are achieved is shown in the appended drawings, wherein like letters designate like parts throughout the several views, and in which:

Fig. 1 is a side view of the vulcanizing press according to the invention in open position;

Fig. 2 is a side view of the vulcanizing press in almost closed position;

Fig. 3 is a side view of the press in closed position;

Fig. 4 is a fractional side view of a closed press comprising an intermediate ring;

Fig. 5 is a top view of the lower part of the press;

Fig. 6 is a part sectional side view of a modified vulcanizing press according to the invention;

Fig. 7 is a part sectional side view of the vulcanizing press according to Fig. 6 at the beginning of the opening thereof, when the tire is loosened;

Fig. 8 is a part sectional side view of the press of Fig. 6 in open position;

Fig. 9 is a fractional rear view of the press shown in Figs. 6 to 8;

Fig. 10 is a part sectional side view of a modified vulcanizing press according to the invention, illustrating the device in closed position;

Fig. 11 is a part sectional side view of the press of Fig. 10 in loosening-up position;

Fig. 12 is a part sectional side view of the press of Fig. 10 in open position;

Fig. 13 is a fractional rear view of the press of Fig. 10.

Referring more particularly to Figs. 1 to 5, the vulcanizing press comprises a conventional upper part $a$ and a lower part $b$ to which a hydraulic cylinder $c$ is pivoted. A piston rod $c^1$ protruding from cylinder $c$ is pivoted to one arm $d$ of two-arm lever $d$, $d^1$. The latter swings about a stationary fulcrum which is supported by an arm $e$ which is fast on the stationary lower part $b$.

The upper part $a$ of the press is swingably supported by arm $d^1$ of the aforementioned two-arm lever, which arm is shorter than arm $d$. Pivot $d^2$ which connects part $a$ with arm $d^1$ is not in the center of gravity of part $a$; in the illustrated device, it is closer to the support $e$. An angular abutment member $f$ is mounted on top of part $a$. Arm $d^1$ is provided with a transverse pin $g$ preferably covered with a yielding material, for example rubber, and extending between the legs of abutment member $f$.

The illustrated vulcanizing press operates as follows:

The tire $h$ to be vulcanized is laid into a suitably shaped recess in the lower part $b$ of the press. At this stage of operaiton the tire does not fit tightly into the recess. The upper part $a$ is slanted upward and the inside of one leg of member $f$ rests against pin $g$. The latter holds the upper part most of the time during which the press is closed. Due to its unsymmetric support, the foward or right part of part $a$ contacts the forward or right part of part $b$ as seen in Fig. 2 before the press is completely closed. Upon further closing, the tire $h$ is progressively contacted beginning on its right side, so that clamping of the tire is avoided. This effect is due to the freely swingable support of part $a$ outside of its center of gravity on lever arm $d^1$.

A similar effect can be obtained if part $a$ is symmetrically supported and its forward or right part is weighted and/or pressed down by a spring. Such modifications can be made by one skilled in the art and are therefore not illustrated.

The mechanism according to the invention can be equally well used if it is desired to insert a ring $k$ between parts $a$ and $b$ of the press (Fig. 4). The intermediate ring $k$ is preferably secured to part $b$ by means of screws or pins 1 (Fig. 5). No other and complicated centering means are required.

Since considerable pressure is transmitted through the two-arm lever $d$, $d^1$ to the upper part $a$, the tire which fits snugly in the press can be firmly compressed, so that the subsequent conventional closing of the press by means of screws or the like can be effected without much effort.

Opening of the press is preferably effected by oil under pressure instead of by compressed air. It frequently happens that the upper part sticks to the tire after the pressure has been released from the upper part. This causes building up of air pressure in cylinder $c$. Expansion of the air causes sudden lifting of the heavy upper part and possibly damage to or even upsetting of the whole device. To avoid this, a transformer from air to liquid pressure in the form of an additional container or cylinder $m$ is provided which is filled with oil or another suitable liquid and connected with cylinder $c$ by a conduit $m^1$ provided with a reducing valve $m^4$. Cylinder $c$ is supplied with compressed air through conduit $c^2$ which is controlled by a valve $c^3$ and cylinder $m$ is supplied with compressed air through conduit $m^2$ which is controlled by valve $m^3$.

In order to open the press, valve $m^3$ is opened and liquid is forced by compressed air from cylinder $m$ through conduit $m^1$ into cylinder $c$. By manipulation of valve $m^4$, the hydraulic pressure acting on the piston in cylinder $c$ can be so adjusted that the press can be opened smoothly even if the upper part sticks or is jammed.

For closing the press, compressed air is admitted to cylinder $c$ through conduit $c^2$ and forces the piston in cylinder $c$ to the left, whereby the liquid is moved from cylinder $c$ back into cylinder $m$.

The press according to the invention can be so constructed that it loosens the vulcanized tire from its form at the same time the press is opened. Figs. 6 to 9 show such a construction and Figs. 10 to 13 a modification thereof.

In both illustrated modifications, the fulcrum of the two-arm lever $d$, $d^1$ is displaceable. In the modification according to Figs. 6 to 9, the pivot $d^3$ supporting the two-arm lever is supported by means of levers $s$ which are pivoted at $s^1$ to the support $e$. The latter has a hole $e^1$ whose diameter is greater than that of pivot $d^3$ so that the latter can move laterally in the hole. The clearance in the hole can be adjusted by manipulation of an adjusting screw $t$.

The device illustrated in Figs. 6 to 9 is operated as follows:

Fig. 6 shows the device in the position after vulcanization of tire $h$ is completed. Opening of the press is effected by admitting compressed air into cylinder $m$ and forcing the oil therefrom into cylinder $c$, whereby rod $c^1$ is moved in the direction of an arrow seen in Fig. 7. Because of the large holes $e^1$, lever $d$, $d^1$ and with it part $a$ is moved to the right until pivots $d^3$ abut against the right side of holes $e^1$. The upper part of press is thereby pushed to the right as indicated by an arrow and tire $h$ is loosened from the form at diametrically opposed points. Upon continued movement of piston rod $c^1$ to the right, part $a$ is lifted. Its left side abuts against an abutment $g^1$ provided on arm $d^1$ so that part $a$ is held in open position as shown in Fig. 8.

Since the tire $h$ was loosened when opening of the press was initiated, it will fall out of part $a$ of the press when the press is opened further as indicated by a dash-dot line in Fig. 8. No special effort and tools are needed to take the tire from the press.

The upper part $a$ of the press is pivoted to arm $d^1$ at a point $d^2$ which is to the left of the center of gravity of part $a$. Therefore the right side of part $a$ will come down first on the tire as in the device shown in Figs. 1 to 3, so that the tire is gradually pressed into the form and squeezing or clamping is avoided. The extent of lateral movement of pin $d^3$ and horizontal movement of part $a$ can be controlled by adjusting screws $t$.

Fig. 10 illustrates a modified arrangement which uses an eccentric for producing horizontal movement of the upper part of the press relative to the lower part for loosening the tire. A bearing pin revolvable in hole $e^1$ of and supporting lever $d$, $d^1$ is provided with eccentrically extending support pins $s^2$, one of which is made fast on one end of an arm or lever $s^3$. The other end of lever $s^3$ is movably connected with the piston rod of a servomotor $c^4$ which may be connected for its operation, by means of conduits $p^1$ and $p^2$, with a source of compressed air which also supplies cylinders $m$ and $c$. The cylinder of servomotor $c^4$ is pivotally connected with arm $d$, a pin $c^5$ extending through an ear at the closed end of the cylinder and through arm $d$. This pin $c^5$ serves also for pivoting arm $d$ to the end of piston rod $c^1$. The servomotor $c^4$ is preferably actuated before actuation of cylinders $m$ and $c$ for opening the press, so that lever $s^3$ and the eccentric pin $s^2$ are turned clockwise and part $a$ is horizontally displaced on part $b$ and the tire is loosened before the press is opened by conducting compressed air into cylinder $m$. Compressed air may be admitted simultaneously through conduit $p^1$ to cylinder $c^4$ and through conduit $m^2$ to cylinder $m$.

Since less air pressure is required in the auxiliary cylinder $c^4$ than in cylinder $c$, the eccentric $s^2$ will be actuated ahead of lever $d$, $d^1$. The pressure of the compressed air admitted to cylinder $m$ is not sufficient to cause flow of oil through conduit $m^1$ into cylinder $c$ until the loosening movement shown in Fig. 11 is completed. Thereupon the upper part $a$ of the mould is lifted as seen in Fig. 12. Since part $a$ is pivoted unsymmetrically, i. e. not in its center of gravity, to lever $d^1$, part $a$ is separated gradually from part $b$, facilitating separation and augmenting the loosening effect. Displacement of the eccentric support of lever $d$, $d^1$ and of mould part $a$ is shown exaggeratedly in Fig. 11. For closing the press, the mechanism is operated in reverse, compressed air being admitted first through conduit $p^2$ to cylinder $c^4$ for centering part $a$, whereupon the air pressure in cylinder $m$ is raised for closing the mould.

The arrangement shown in Figs. 10 to 13 produces sufficient force for relative displacement of the two mould shells to loosen every type of tire.

While the preferred embodiments of this invention are shown and described, modifications other than those disclosed herein may be made without departing from the spirit of the invention, and reference is therefore made to the appended claims for a definition of the scope of this invention.

I claim:

1. A vulcanizing press for automobile tires, comprising a stationary lower part, an upper part, each part having an annular recess opposite the annular recess of the other part and adapted to receive a tire in substantially horizontal position when the press is closed, a two-arm lever having a fulcrum supported by said lower part, said upper part being freely swingably suspended from one arm of said two-arm lever which arm is the sole support of said upper part, a pneumatic cylinder swingably suspended from said lower part and a piston rod projecting from said cylinder and being pivoted to the other arm of said two-arm lever.

2. A vulcanizing press as defined in claim 1, said two-arm lever swinging in a substantially vertical plane and said two-arm lever being connected with said upper part at a point between the center of gravity of the upper part and the point where said two-arm lever is fulcrumed on said lower part.

3. A vulcanizing press as defined in claim 1, said two-arm lever swinging in a substantially vertical plane and the portion of said upper part at the side which is beyond its suspension from said two-arm lever with respect to the fulcrum of said lever is heavier than the side which is proximal of said fulcrum.

4. A vulcanizing press as set forth in claim 3, comprising abutment means individually connected with said upper part and with the arm of the two-arm lever from which it is suspended, said abutment means abutting each other and limiting swinging of said upper part on said two-arm lever due to gravity when said upper part is lifted from the lower part by said lever.

5. A vulcanizing press for automobile tires, comprising, in combination, a stationary lower part, an upper part, each part having an annular recess opposite the annular recess of the other part and adapted to receive a tire in substantially horizontal position when the press is closed, a two-arm lever having a fulcrum supported by said lower part, said upper part being freely swingably suspended from one arm of said two-arm lever which arm is the sole support of said upper part, a pneumatic cylinder swingably suspended from said lower part, a piston rod projecting from said cylinder and being pivoted to the other arm of said two-arm lever, a ring member, and connecting means for fixing said ring member to said lower part coaxially with said annular recesses, said ring member extending into said upper part when the press is closed.

6. A vulcanizing press for automobile tires, comprising a stationary lower part having an annular recess, an upper part having an annular recess opposite the recess in said lower part and adapted to receive a tire in substantially horizontal position when the press is closed, said lower part having a flat top surface, said upper part having a flat bottom surface, said surfaces abutting against each other when the press is closed and affording unobstructed lateral sliding of said upper part on said lower part, a support fast on said lower part and having a substantially horizontal bearing hole, a two-arm lever, a fulcrum pin connected with said lever and extending through and having a smaller diameter than said hole, said upper part being swingably connected with and depending from one arm of said lever, a pneumatic cylinder positioned below and having one end connected with said lower part, and a piston rod projecting from the other end of said cylinder and being pivoted to the other arm of said two-arm lever, the latter moving substantially horizontally and moving the upper part likewise therewith due to the clearance between said bearing hole and said pin, upon actuation of said lever by said piston rod at the initiation of opening the press and when closing of the press is being completed.

7. A vulcanizing press as set forth in claim 6, comprising a lever having one end swingably connected with said support, said fulcrum pin being connected with the other end of said lever and supported thereby.

8. A vulcanizing press for automobile tires, comprising a lower part having an annular recess, an upper part having an annular recess opposite the recess in said lower part and adapted to receive a tire in substantially horizontal position when the press is closed, a support fast on said lower part, a two-arm lever, a bearing pin revolvable in said lever, a support pin extending eccentrically from said bearing pin and being revolvably supported by said support, said upper part being swingably connected with and depending from one arm of said lever, a pressure fluid cylinder positioned below and having one end connected with said lower part, and a piston rod projecting from the other end of said cylinder and being pivoted to the other arm of said two-arm lever, an arm extending at a right angle from said support pin, and actuating means connected with the other end of said arm for swinging it and displacing the fulcrum of said two-arm lever and thereby substantially horizontally displacing said upper part.

9. A vulcanizing press as defined in claim 8, said actuating means comprising an auxiliary fluid pressure actuated piston movable in a cylinder pivotally connected with said other arm of said two-arm lever.

10. A tire vulcanizing press comprising a lower part, an upper part, a power cylinder disposed below said lower part, a piston rod projecting from said power cylinder, a two-arm lever pivoted to said lower part, one arm of said two-arm lever being pivoted to said piston rod for actuation thereby, said upper part being freely swingably suspended from the other arm of said two-arm lever, which arm forms the sole support of said upper part, said parts having flat mating surfaces affording lateral sliding movement of said upper part on said lower part when the press is closed and for loosening the upper part from the tire when the press is opened.

11. A tire vulcanizing press comprising a lower part, an upper part, a power cylinder disposed below said lower part, a piston rod projecting from said power cylinder, a two-arm lever, a fulcrum pin connected with said lever, said pin being laterally swingably supported by said lower part, a bearing for said pin connected with said lower part and having an opening for receiving said pin, which opening is larger than the cross-section of said pin, one arm of said two-arm lever being pivoted to said piston rod for actuation thereby, said upper part being freely swingably suspended from the other arm of said two-arm lever, which arm forms the sole support of said upper part, said parts having flat mating surfaces affording lateral sliding movement of said upper part on said lower part upon lateral movement of said pin in said opening for loosening the upper part from the tire when the press is opened and for proper seating of said upper part on said lower part when the press is closed.

12. A tire vulcanizing press comprising a lower part, an upper part, a power cylinder disposed below said lower part, a piston rod projecting from said power cylinder, a two-arm lever, an eccentric disc rotatably supporting said two-arm lever, a pin eccentrically connected with said disc and supported by said lower part, means for rotating said pin, one arm of said two-arm lever being pivoted to said piston rod for actuation thereby, said upper part being freely swingably suspended from the other arm of said two-arm lever, which arm forms the sole support of said upper part, said parts having flat mating surfaces affording lateral sliding movement of said upper part on said lower part upon rotation of said pin for loosening the upper part from the tire when the press is opened and for proper seating of said upper part on said lower part when the press is closed.

13. A tire vulcanizing press comprising a lower part, an upper part, a power cylinder disposed below said lower part, a piston rod projecting from said power cylinder, a two-arm lever pivoted to said lower part, one arm of said two-arm lever being pivoted to said piston rod for actuation thereby, said upper part being freely swingably and unsymmetrically suspended from the other arm of said two-arm lever, which arm forms the sole support of said upper part, said parts having flat mating surfaces affording lateral sliding movement of said upper part on said lower part when the press is closed and for loosening the upper part from the tire when the press is opened.

References Cited in the file of this patent

UNITED STATES PATENTS

| Number | Name | Date |
|---|---|---|
| 706,688 | Reynders et al. | Aug. 12, 1902 |
| 1,379,203 | Mundale | May 24, 1921 |
| 1,666,649 | Harris | Apr. 17, 1928 |
| 1,751,392 | Burch | Mar. 18, 1930 |
| 1,815,400 | De Mattia | July 21, 1931 |
| 1,832,856 | Brundage | Nov. 24, 1931 |
| 1,939,670 | De Mattia | Dec. 19, 1933 |
| 2,308,977 | Iverson et al. | Jan. 19, 1943 |
| 2,340,231 | Soderquist | Jan. 25, 1944 |
| 2,365,764 | Kastner | Dec. 26, 1944 |
| 2,508,522 | Kastner | May 23, 1950 |